United States Patent
Tiesler

(10) Patent No.: US 7,416,069 B2
(45) Date of Patent: Aug. 26, 2008

(54) CLUTCH ARRANGEMENT IN AN AUTOMATIC TRANSMISSION HAVING AN INSTALLATION SPACE-SAVING COOLANT SUPPLY

(75) Inventor: Peter Tiesler, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 303 days.

(21) Appl. No.: 10/565,450

(22) PCT Filed: Jun. 28, 2004

(86) PCT No.: PCT/EP2004/006963

§ 371 (c)(1),
(2), (4) Date: Mar. 13, 2006

(87) PCT Pub. No.: WO2005/019675

PCT Pub. Date: Mar. 3, 2005

(65) Prior Publication Data

US 2006/0289269 A1  Dec. 28, 2006

(30) Foreign Application Priority Data

Jul. 23, 2003  (DE)  ............................... 103 33 431

(51) Int. Cl.
*F16D 25/10* (2006.01)
*F16D 25/0638* (2006.01)

(52) U.S. Cl. .................. 192/87.11; 192/106 F
(58) Field of Classification Search ............... 192/87.11, 192/87.18, 113.1, 113.3
See application file for complete search history.

(56) References Cited

U.S. PATENT DOCUMENTS

| 4,010,833 A | 3/1977 | Brendel et al. |
| 4,732,253 A | 3/1988 | Hiramatsu et al. |
| 4,759,432 A * | 7/1988 | Jurgens et al. ........... 192/106 F |
| 5,647,467 A | 7/1997 | Yamauchi |
| 5,887,690 A | 3/1999 | Haupt |
| 6,059,682 A | 5/2000 | Friedmann et al. |
| 6,120,410 A | 9/2000 | Taniguchi et al. |
| 6,622,839 B2 | 9/2003 | Kundermann et al. |
| 7,021,422 B2 * | 4/2006 | Busold et al. ............ 192/87.13 |
| 7,147,095 B2 * | 12/2006 | Kraxner et al. ........... 192/87.15 |

(Continued)

FOREIGN PATENT DOCUMENTS

DE   41 36 040 C1   1/1993

(Continued)

*Primary Examiner*—Rodney H Bonck
(74) *Attorney, Agent, or Firm*—Davis Bujold & Daniels, P.L.L.C.

(57) ABSTRACT

A clutch arrangement in an automatic transmission, comprising two axially adjacent multi-disk clutches (B, E) to each is assigned a piston/cylinder arrangement for axially actuating the clutch, a pressure compensation space for a dynamic clutch actuation pressure compensation and a mechanism for supplying lubricant or cooling medium. The aim is to reduce the axial overall length of a transmission of this type. The disk packets of both clutches (B, E) are placed one above the other in a radial manner, the pressure compensation space (25) for the radially outer clutch (B) is permitted to axially border on the pressure space (8) for actuating the piston (17) of the radially inner clutch (E), and the lubricant or cooling medium flow (30) for the radially outer clutch (B) is directly tapped from the pressure compensation space (25) for actuating the outer clutch (B).

38 Claims, 1 Drawing Sheet

U.S. PATENT DOCUMENTS

| | | |
|---|---|---|
| 2003/0075413 A1 | 4/2003 | Alfredsson |
| 2004/0035666 A1 | 2/2004 | Grosspietsch et al. |
| 2004/0077449 A1 | 4/2004 | Biermann et al. |

FOREIGN PATENT DOCUMENTS

| | | |
|---|---|---|
| DE | 198 00 490 A1 | 8/1998 |
| DE | 100 04 186 A1 | 4/2001 |
| DE | 100 34 677 A1 | 2/2002 |
| DE | 101 11 202 A1 | 6/2002 |
| DE | 102 48 172 A1 | 4/2004 |
| FR | 2 815 093 A1 | 4/2002 |
| WO | WO-01/42674 A1 | 6/2001 |

* cited by examiner

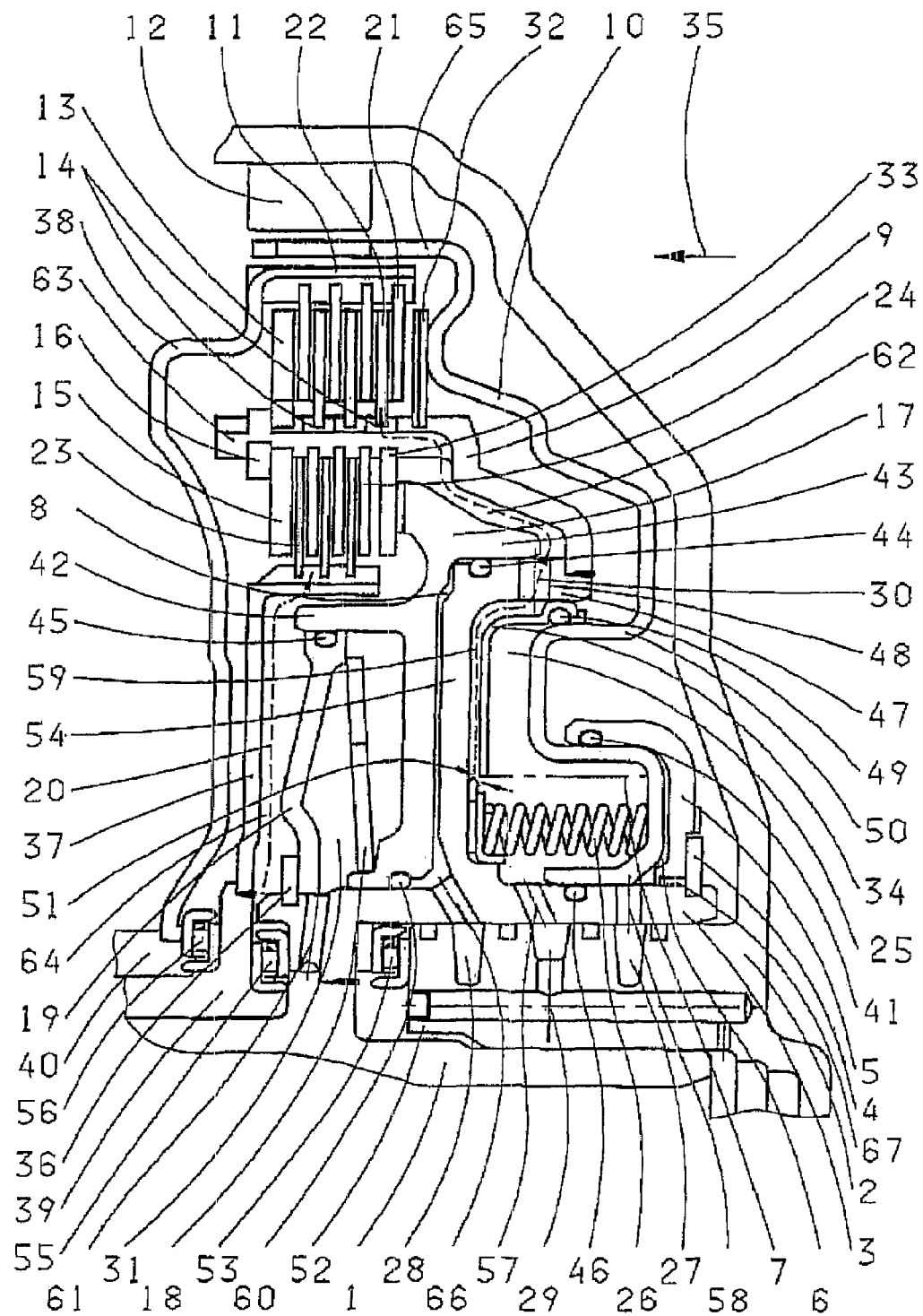

CLUTCH ARRANGEMENT IN AN AUTOMATIC TRANSMISSION HAVING AN INSTALLATION SPACE-SAVING COOLANT SUPPLY

This application is a national stage completion of PCT/EP2004/006963 filed Jun. 28, 2004 which claims priority from German Application Serial No. 103 33 431.9 filed Jul. 23, 2003.

FIELD OF THE INVENTION

The invention relates to a clutch arrangement in an automatic transmission having space-saving coolant supply.

BACKGROUND OF THE INVENTION

Multiple examples exist for the arrangement of clutches and actuating devices thereof in automatic transmissions. U.S. Pat. No. 6,120,410 shows a clutch arrangement in an automatic transmission in which a part, designed somewhat cup-shaped in transverse section, is constructed as an outer disc carrier. Radially within the outer disc carrier are formed the inner and outer discs of two multi-disc clutches disposed axially adjacent on the same radial height, piston-cylinder arrangements having each one actuating piston for actuation of the two clutches, the same as pressure compensation spaces for a dynamic pressure compensation regarding the actuating force of the actuating pistons.

Also known from this publication is to form a pressure compensation space using one clutch piston and one so-called baffle plate, the same as to situate one recoil spring between the baffle plate and the piston. Lubricant is supplied to the pressure compensation space via a lubricant hole of the outer disc carrier.

Further known from the Applicant's unpublished DE-102 48 172 is an automatic transmission having a multi-disc clutch which has one serve device located within a disc carrier in the form of a piston-cylinder arrangement with dynamic pressure compensation for actuating a clutch. In addition, a planetary gearset, having one planet carrier, belongs to this automatic transmission.

The servo device of this transmission consists of one piston which, together with a suitably designed wall of the disc carrier, forms a pressure space. A pressurization of the pressure space, via a pressure-medium supply hole in the disc carrier, produces an axial displacement of the piston toward the discs after overcoming the recoil force of a spring.

Upon the side of the piston opposite the pressure space, a pressure compensation space is situated by way of a dynamic pressure appearing upon the clutch as a result of the clutch rotation is compensated at least approximately. To this end, the pressure compensation space is filled with a lubricant fed via a hole placed in a hub of the disc carrier. In this known transmission, at the same time, the pressure compensation space, located radially below the clutch discs, is formed by one streamlined spacer disc as an axially stationary baffle plate and by a cup-shaped section of the axially displaceable actuating piston.

Lubricant is supplied to the planetary gears and to the pressure compensation space, via a common lubricant supply situated in the area of the inner diameter of the streamlined spacer disc, and is fed by the already mentioned lubricant supply hole. On the radially inner lubricant inlet in the pressure compensation chamber, the lubricant flow from the lubricant supply hole is divided in two partial flows where one partial flow is guided to the pressure compensation chamber and a second partial flow is guided to a lubricant chamber near the planetary gears.

To obtain the shortest clutch arrangement length, this transmission provides for a streamlined spacer disc, which has axially, stamped corrugations of radial direction distributed over its periphery. The axially-formed, stamped grooves are connected either with a lubricant chamber for lubricating the planetary gears or with the pressure compensation space for the clutch actuating pistons.

Against this background, the invention is based on the problem of introducing a clutch arrangement for an automatic transmission which, with great saving of space, makes possible the supply with a lubricant or coolant of at least one pressure compensation space and of at least one multi-disc clutch possible.

The solution of this problem results form the features of the main claim while advantageous developments and other embodiments can be deduced from the sub-claims.

SUMMARY OF THE INVENTION

According to DE-102 48 172, the invention is based on the knowledge that a division of the lubricant and/or coolant flow is not necessary and that at least one clutch allows for at least one clutch actuating piston with the lubricant and/or coolant feeding from the pressure compensation chamber.

The point of departure of the invention is, therefore, a clutch arrangement for an automatic transmission having two axially adjacent, multi-disc clutches B, E with each of which are coordinated one piston-cylinder arrangement for the axial clutch actuation; one pressure compensation space for a dynamic clutch actuating pressure compensation, and means for lubricant or coolant supply. According to the invention, this transmission provides for disc sets of both clutches B, E to be radially placed one above the other; the piston-cylinder arrangements for actuation of both clutches B, E to be disposed at least to a great extent axially adjacent; the pressure compensation space for the radially outer clutch B abuts axially on the pressure space for actuating the piston of the radially inner clutch E, and that the lubricant or coolant flow for the radially outer clutch B to be tappable from the pressure compensation space for actuating the outer clutch B.

In one development of the invention, a disc carrier is provided between the pressure space for actuating the piston of the radially inner clutch E and the pressure compensation space for the piston of the radially outer clutch B, which is situated on which the inner discs of the outer clutch B and the outer discs of the inner clutch E are jointly fastened non-rotatably and axially movably.

In this connection, it is advantageous that this common disc carrier be connected by its radially inner section with a hub located upon a transmission shaft.

In addition, it is preferred that an actuating cylinder be situated upon the hub in the cup-shaped aperture of which a radially inner section of the piston for actuating the outer clutch B is axially movably passed forming a pressure space.

In another development of the invention, the actuating cylinder can be also designed with two parts; the radially inner wall being implemented by the outer side of the hub and the axial rear wall and radial outer wall by one part mounted on the hub and axially secured by a guard ring.

To reduce the assembly cost, it can also be provided that a sealing element can also be provided to vulcanize the inner side of the axially aligned section of the pressure cylinder.

According to the invention, to minimize the axial length of the automatic transmission, it is additionally proposed that the side pointing away axially from the pressure space of the piston-cylinder arrangement for the radially outer clutch B and the radially inner section of the common disc carrier form the pressure compensation space for the actuating piston for the radially outer clutch B.

To ensure a recoil motion of the actuating piston for the outer clutch B when the actuating pressure relaxes, it is additionally proposed that in the pressure compensation space, coordinated with the above mentioned actuating piston, one recoil element be located which directly or indirectly supports itself by one of its ends on the actuating piston and by its other end on a radially inner section of the common disc carrier.

In another very important development of the invention, now with more space saving, it is now proposed that in the pressure compensation space an essentially radially aligned, baffle plate be fastened on the axially inner section of the common disc carrier so that between the two parts there is formed a coolant or lubricant guide space leading to the outer clutch B in order to be able to transport the coolant or lubricant from the pressure compensation space for the actuating piston of the radially outer clutch B to the latter.

The baffle plate is preferably designed so as to have, in a radially inner section, a passage through which the coolant or lubricant can enter from the pressure compensation space for the outer clutch B into the coolant or lubricant guide room.

For relaying the coolant or lubricant, it is preferred that, in the area of radially outer section of the baffle plate in the common disc carrier, a radial aperture be formed through which the coolant or lubricant can pass.

In a further development of the invention, radially above the aperture in the common disc carrier, between the disc carrier and a radially outer section of the actuating piston for the radially inner clutch E, one duct is formed for the coolant or lubricant flow, which ultimately leads to the common disc carrier for both clutches E, B.

To make guiding the coolant or lubricant flow possible from the inner side of the common disc carrier to the clutch discs, it can also be provided that in a paraxially aligned section of the common disc carrier, radially aligned apertures are formed through which the coolant or lubricant flow is guided directly to the discs of the outer clutch B.

Another positive aspect of the invention concerns the axial arrangement of the pistons relative to the common disc carrier. In the radial area of the inner clutch E, it is preferably provided that both actuating pistons be disposed axially directly on the right and left sides adjacent the common disc carrier.

It is a further advantage that on its radially inner section, the baffle plate is pressed by the recoil element situated in the pressure compensation space against the radially inner section of the common disc carrier so as to ensure or at least support the axial press fit of this baffle plate on the common disc carrier.

For assembly reasons, on its radially outer section, it is preferred that the baffle plate be effectively clamped, radially on the inner side of a horizontally aligned section of the common disc carrier.

The baffle plate can also carry a sealing means on the inner side of its radially outer section, which pressure-tight seals the pressure compensation space against the actuating piston for actuation of the outer clutch B. The sealing means can be, for example, vulcanized on the baffle plate, but can also be made as a separate structural element.

In development of the inventive clutch arrangement, with regard to the pressure space of the piston-cylinder arrangement for actuating the radially inner clutch E, it is proposed that it be essentially formed by the wall of the inner section of the common disc carrier pointing away from the pressure compensation space for the actuating piston of the outer clutch B and by a radially inner section of the actuating piston for the radially inner clutch E.

To implement a dynamic pressure compensation for the actuating piston for the radially inner clutch, in addition, it is preferable to provide that, upon the side pointing away from the pressure space of the actuating piston for the inner clutch E, a pressure compensation space is formed, which is axially limited by a baffle plate fastened on the hub, the same as radially by the hub an by the "t" leg of the piston on the left side and pointing away from the common disc carrier.

To make possible a recoil motion of the actuating piston for the radially inner clutch E in the pressure compensation space for the actuating piston, a recoil element is situated which supports itself axially by one end on the baffle plate and by the other end on the actuating piston.

It is most advantageous in this design that the baffle plate seals the pressure compensation space against the left side "t" leg of the piston by a sealing agent.

It is also appropriate that the piston for the actuation of the inner clutch E be axially passed by its right-side "t" leg to an essentially horizontally aligned sector of the common disc carrier.

As to the fastening of the baffle plate and of the cup-shaped housing of the piston-cylinder arrangement for the radially outer clutch B, it can also be provided that the parts be held axially upon the hub by means of snap rings or guard rings.

The hub itself is located upon an axial continuation of the transmission housing and supported against it via an axial bearing.

The transmission shaft upon which the hub carrying the common disc carrier is situated is preferably designed as transmission input shaft.

In one other development of the invention clutch arrangement, it is provided that upon the side of the baffle plate remote from the pressure compensation space for the actuating piston of the inner clutch E, an inner disc carrier of the inner clutch E is situated and connected with a transmission shaft.

It is further advantageous that between the inner disc carrier of the inner clutch E, a flow duct is formed for receiving a lubricant or coolant flow for the inner clutch E.

For reasons of installation space, it is adequate that on the side remote from the last mentioned flow duct of the inner disc carrier of the radially inner clutch E, the outer disc carrier of the radially outer clutch B is placed.

Another development of the invention provides that the outer disc carrier of the radially outer clutch B is situated on a transmission shaft which, via an axial bearing, is secured against the transmission shaft upon which is fastened the inner disc carrier of the inner clutch E.

It is also advantageous that the transmission shaft, upon which the inner disc carrier of the inner clutch E is fastened, is supported against the hub by means of an axial bearing.

Another embodiment of the invention only marginally related to the space-saving clutch arrangement, but nevertheless very advantageous is to be seen in the actuating piston of the outer clutch B, is designed on its radially outermost end as rotational speed indicator for a rotational speed sensor which is passed through the transmission housing into the spatial proximity of the rotational speed indicator.

Furthermore, the radial arrangement of the discharge aperture in the baffle plate defines the maximum level of fluid that the lubricant for coolant taps in the pressure compensation space for the actuating piston of the outer clutch B.

The coolant and lubricant are applied to the pressure compensation space for the piston of the outer clutch B and to the clutch at least in stages via a hole in the hub.

The pressure compensation space for the actuating piston of the radially internally situated clutch is, on the contrary, supplied with coolant or lubricant via a hole in the hub which, for its part, is inflow connection with a hole in one of the transmission shafts.

Finally, the pressure space for the piston-cylinder arrangement for actuation of the outer clutch B is supplied with an actuating pressure medium via a hole in the hub which, for its part, is connected according to inflow technique with a hole or peripheral groove in the continuation of the transmission housing.

Lastly, let it be known that the pressure space of the actuating cylinder for the radially inner clutch E is also filled, via a hole in the hub, which is inflow connection, via a separate hole or annular groove, in the continuation of the transmission housing.

BRIEF DESCRIPTION OF THE DRAWINGS

The invention will now be described, by way of example, with reference to the accompanying drawings in which:

The FIGURE shows a cross-section through an automatic transmission in the area of two multi-disc clutches E and B located in a transmission housing 2 directly adjacent each other both radially and axially.

DETAILED DESCRIPTION OF THE INVENTION

The basic concept of this clutch arrangement provides that the clutch E is situated radially within a clutch space formed by a disc carrier of the clutch B. The disc carrier is designated with 9 and designed as a common disc carrier for both clutches B, E on which an inner disc 22 of a disc set of the radially outer clutch B and an outer discs 24 of a disc set of the radially inner clutch E are disposed axially movably and non-rotatably. The disc set of the (inner) clutch E is, therefore, situated on a smaller diameter than the disc set of the (outer) clutch B, spatially seen, preferably radially below the disc set of the (outer) clutch B. The common disc carrier 9 is preferably installed in the area of the side close to the transmission housing of the clutches E, B.

It is further provided that an outer disc carrier 38 of the outer clutch B and an inner disc carrier 37 of the inner clutch E is situated on the side of the clutches E, B remote from the transmission housing and is non-rotatably connected with transmission shafts 39 or 40.

On the common disc carrier 9 are axially stationarily fastened on end discs 13, 15 serving for the discs of both clutches B, E as support against actuating forces exerted upon the discs by clutch actuating devices. The stability thereof is ensured by a snap ring 16 clamped in a stop groove on the common disc carrier 9.

On the side of the clutch discs, axially opposite the snap ring 16, there is axially movably disposed on each one of the two clutches B, E, upon the common disc carrier 9, one compression ring 32, 33 against which can be exerted an actuating force by way of a clutch actuating devices for closing the clutches 35. The closing force acts in both clutches E, B in the same direction. The pressure rings 32, 33 can each be designed, for example, as a corrugated spring.

Both clutch actuating devices involved are designed as piston-cylinder arrangements integrated in the transmission. In the embodiment shown here, a pressure-space 6 forming actuating cylinder of the actuating arrangement for the radially outer clutch B is designed with two parts having one cylinder 5 and one hub 3. The cylinder 6 is designed, for example, as a metal plate converting part or as a cast metal part in the form of a pot open in direction of the disc set of the clutch B with one radially and one axially aligned section. The cylinder 5 is here mounted on the hub 3 on the inner diameter of its radially aligned section and secured by means of a guard ring 4 against an axial displacement in direction to a transmission housing 2. By way of this design, the radially outwardly pointing side of the hub 3 forms the second part of the pressure-space 6 forming an actuating cylinder of the actuating arrangement for the radially outer clutch B. The cylinder 5 is here pressure-tight sealed against the hub 3. In the embodiment shown, a sealing element 67 is to this end vulcanized on the inner side of the axially aligned section of the cylinder 5. But in another development, it can also be provided that the cylinder 5 is sealed, relative to the hub 3, by a separate sealant inserted in a suitable groove or recess of the cylinder or of the hub 3. Such a separate sealant can be, for example, a commercially available O-ring or a shaped seal.

The hub 3 is coaxially aligned to the two clutches B, E and rests on an axial continuation 52 of the housing 2; is rotatably supported on the continuation 52 and is axially propped by means of an axial bearing 53 against the continuation 52. In this connection, it also is to be observed that a radially outwardly extending section 54 is formed on the hub 3, which is part of the common disc carrier 9 or at least operatively connected therewith.

Reverting to the actuating device for the radially outer clutch B, it is to be observed that thereto belongs an actuating piston 10 which is axially movably lodged in the cylinder 5 forming the pressure space 6. The piston 10 is passed near the transmission housing 2 to the radially outer clutch B and brought to abut on the pressure ring 32 thereof. Besides, on a radially outermost end 65 of the actuating piston 10, a peripheral delimitation is formed which serves as rotational speed signal indicator for a rotational speed sensor 12 introduced through the transmission housing 2.

On the side of the actuating piston 10 remote from the pressure space 6, a pressure compensation chamber 25 for the piston 10 is formed, other wall parts being formed by the hub 3 or by a radial section 54 thereof.

One recoil element 26 is located paraxially aligned to the actuation direction 35 and designed here in this pressure compensation chamber 25, for example, as a compression spring set. Instead of the compression spring set, a plate spring obviously can also be used. The recoil element 26 is prestressed between the central section 54 of the common disc carrier 9 and the piston 10. In the embodiment shown, a disc-shaped section of a baffle plate 34 is clamped between the end of the compression spring set (26) on the disc carrier side and the section 54 of the disc carrier whereby the baffle plate 34 is axially pressed on the disc carrier 9. In another development, the recoil element 26 can obviously abut directly axially on the section 54 of the disc carrier in which case another suitable axial security has to be provided for the baffle plate 34.

The baffle plate 34 for its part is clamped between the radial section 54 of the hub 3 and a paraxial section 47 of the common disc carrier 9 in a manner such that in the area of the section 47, it rests on a paraxial section 50 of the actuating piston 10.

It is to be mentioned in this connection that between the actuating piston 10 and the cylinder 5 or the hub 3, the same as between the piston 10 and the baffle plate 34, sealants 41, 46, 49 are situated by means of which the pressure space 6 and the pressure compensation space 25 are axially movably sealed against each other and against non-pressurized transmission areas.

The pressure space 6 for the piston-cylinder arrangement 3, 5, 10 for actuating the outer clutch B is supplied with an actuation pressure medium via a hole 58 in the hub 3 which for its part is connected by inflow technique with a hole or peripheral groove 27 in the continuation 52 of the transmission housing 2.

The pressure compensation space 25 is filled with a lubricant and/or coolant via a hole 57 in the hub 3 which is fed by a hole or peripheral groove 29 in the continuation 52 of the transmission housing 2.

Regarding the filling of a pressure space 8 for actuating the inner clutch E, it is provided that the filling be effected via a hole 66 in the hub 3 which is inflow connection with a separate hole or an annular groove 28 in the continuation 52 of the transmission housing 2.

The baffle plate 34 is now designed and introduced in the pressure compensation space 25 so as to keep a flow duct 59 free between the latter and the radial section 54 of the hub 3 which, leading to the pressure compensation space 25, has one inlet aperture 51 for the coolant or lubricant and one outlet aperture 48 in the horizontal section 47 of the common disc carrier 9.

The place of the inlet aperture 51 in the flow duct 59 is selected in radial direction to the baffle plate 34 so as to coincide with a predetermined overflow height 7 in the pressure compensation space 25.

Coolant or lubricant reaching the duct 59 from the pressure compensation space 25 migrates radially outwardly during operation of the transmission as result of centrifugal forces so that it passes this aperture 48 in the horizontal section 47 of the common disc carrier 9 and, according to the dotted line, moves farther radially outwards into a flow duct 62 between the common disc carrier 9 for both clutches B, E and an actuating piston 17 for the inner clutch E. This liquid subsequently reaches via piercing 14 in a paraxial section 63 of the common disc carrier 9 which bears the clutch discs between the clutch discs of the outer clutch B.

As this illustration makes clear, the proposed design very advantageously and with axial saving of installation space effects the supply of the outer clutch B with coolant or lubricant, the pressure compensation space 25 being able, at the same time, to serve as a storage space for the coolant or lubricant medium.

The actuating device for the radial inner clutch E is formed by a piston-cylinder arrangement, the pressure space 8 of which is delimited by a paraxial section of the hub 3, the side pointing away from the baffle plate 34 of the radial section 54 of the hub 3 and one section of the actuating piston 17 of this actuating device.

The actuating piston 17 for actuating the radially clutch E has an approximately "t" shaped, across-sectional geometry with a radially inner section, a radially outer section, the same as a left-side "t" leg 42 pointing to the common disc carrier 9. The ride-side "t" leg 43 pointing to the common disc carrier 9 is here passed to the paraxial section 47 of the common disc carrier 9.

The pressure space 8 is, in addition, sealed against the hub 3 via a sealing medium 44 between the common disc carrier 9 and the right-side "t" leg 43 of the actuating piston 17, the same as via a sealing medium 60 on the radially innermost section of the actuating piston 17.

On the side of the actuating piston 17, opposite the pressure space 8 of the actuating device for the inner clutch E, a pressure compensation space 31 is formed for the latter. Via a hole 61 in the hub 3, the same as a hole here (not shown in the transmission shaft 1), coolant or lubricant is supplied.

In this pressure compensation space 31 can also be seen a recoil element 18, here designed as plate spring, which supports itself axially by one side on the actuating piston 17 and by the other side on a baffle plate 19. The baffle plate 19 is mounted on the hub 3 and axially secured by means of a snap ring 36. On its radial end, the baffle plate 19 in addition carries a sealant 45 by means of which the pressure compensation space 31 is sealed against the piston 17.

Upon the side of the baffle plate 19 remote from the pressure compensation space 31 (shown in dotted line) is a flow route 64 for a coolant or a lubricant flow 20 which, from the area of the hub 3, leads radially outwardly to the inner side of the inner disc carrier 37 for the inner clutch E. By way of piercing in the inner disc carrier 37, the fluid reaches directly between the discs of the clutch E. The coolant or lubricant flow 20 is fed via one hole in a transmission shaft.

Finally, for the sake of completion of the description of this clutch arrangement, let it be known that the inner disc carrier 37 carrying a disc 23 of the inner clutch E is connected with the transmission shaft 39 which, in this embodiment, supports itself via an axial bearing 55 against the hub 3 and the transmission shaft 1.

The same is provided for the outer disc carrier 38 of the radially outer clutch B which carries outer discs 21 on a paraxial section 11. Said outer disc carrier 38 is connected with another transmission shaft 40 and/or other transmission parts (not shown here), and is axially supported by means of an axial bearing 56 against the just mentioned transmission shaft 39.

REFERENCE NUMERALS 1 transmission shaft; transmission input shaft
2 transmission housing; cover of the transmission housing
3 hub
4 guard ring
5 cylinder for the actuating device for the radially outer clutch B
6 pressure space for clutch B
7 overflow height in the pressure compensation space for clutch B
8 pressure space for clutch E
9 common disc carrier for clutches B and E
10 actuating clutch for clutch B
11 paraxial section on the disc carrier for the outer discs of the clutch B
12 rotational speed sensor
13 end disc of the clutch B
14 piercing for lubricant oil supply of clutch B
15 end disc of the clutch E
16 snap ring
17 actuating piston of the clutch E
18 recoil element for the piston of the clutch E
19 baffle plate of the clutch E
20 coolant flow for clutch E
21 outer discs of the clutch B
22 inner discs of the clutch B
23 inner discs of the clutch E
24 inner discs of the clutch E
25 pressure compensation space for the clutch B
26 recoil element for the clutch B
27 hole or peripheral groove in the continuation 52
28 hole or peripheral groove in the continuation 52
29 hole or peripheral groove in the continuation 52
30 coolant or lubricant flow for the clutch B 31 pressure compensation space for the clutch E
32 compression ring for clutch B
33 compression ring for clutch E
34 baffle plate in the pressure compensation space for clutch B
35 closing direction of the clutches B and E
36 snap ring
37 inner disc carrier of the inner clutch E
38 outer disc carrier for the outer clutch B
39 transmission shaft
40 transmission shaft
41 sealant
42 left "t" leg of the actuating piston 17
43 right "t" leg of the actuating piston 17
44 sealant
45 sealant
46 sealant
47 paraxial section of the common disc carrier 9
48 aperture in the common disc carrier
49 sealant
50 paraxial section of the actuating piston 10
51 aperture in the baffle plate 34
42 axial continuation of the transmission housing
53 axial bearing
54 central section of the common disc carrier 9 or radial section of the hub 3
55 axial bearing
56 axial bearing
57 hole in the hub 3 for supply of the pressure compensation space 5
58 hole in the hub 3 for supply of the pressure space 6
59 coolant or lubricant guide space for the coolant or lubricant flow 30
60 sealant
61 hole for supply of the pressure compensation space 31
62 flow duct for the coolant or lubricant flow 30
63 paraxially aligned outer section of the common disc carrier 9
64 flow route
65 radially outer section of the piston 10
66 hole in the hub
67 sealant

The invention claimed is:

1. A clutch arrangement in an automatic transmission, the clutch arrangement comprising axially adjacent multi-disc radially outer and inner clutches (B, E) each of which having a piston-cylinder arrangement for axial clutch actuation, a pressure space for axial actuation, a pressure compensation chamber (25) for a dynamic clutch actuation pressure compensation and a lubricant system for lubricant or coolant supply, the radially outer and the radially inner clutches (B, E) being disposed radially one above another, the piston-cylinder arrangement for actuation of the radially outer and the radially inner clutches (B, E) are at least, to a great extent, axially disposed side by side, the pressure compensation chamber (25) for the radially outer clutch (B) is located axially next to the pressure space (8) for actuation of a piston (17) of the radially inner clutch (E) and a lubricant or coolant (30) for the radially outer clutch (B) is tapped from the pressure compensation chamber (25) for actuation of the radially outer clutch (B).

2. The clutch arrangement according to claim 1, wherein between the pressure space (8) for actuation of the piston (17) of the radially inner clutch (E) and the pressure compensation chamber (25) for a piston (10) of the radially outer clutch (B), a common disc carrier (9) of the radially outer and of the radially inner clutch (B, E) is situated on which both inner discs (22) of the radially outer clutch (B) and also outer discs (24) of the radially inner clutch (E) are jointly non-rotatably and axially movably fastened.

3. The clutch arrangement according to claim 2, wherein the common disc carrier (9) is connected, on a radially inner section, with a hub (3) of the common disc carrier (9) situated upon a transmission shaft (1) and connected with the transmission shaft (1).

4. The clutch arrangement according to claim 1, wherein upon a hub (3), a cylinder (5) and a radially inner section of a piston (10) of the radially outer clutch (B) are situated and for a pressure space (6) therebetween.

5. The clutch arrangement according to claim 4, wherein the cylinder (5) comprises an axially rear wall and a radially outer wall which are integral with one another and secured by a guard ring (4) to the hub (3).

6. The clutch arrangement according to claim 4, wherein the cylinder (5) is sealed relative to the hub (3).

7. The clutch arrangement according to claim 6, wherein a sealant (67) is vulcanized on an inner side of an axially aligned section of the cylinder (5).

8. The clutch arrangement according to claim 6, wherein a sealant seals the cylinder (5) relative to the hub (3).

9. The clutch arrangement according to claim 1, wherein the pressure compensation chamber (25) for a piston (10) of the radially outer clutch (B) is formed between a side of the piston-cylinder arrangement for the radially outer clutch (B) facing away from a pressure space (6) and a radially inner section (54) of a common disc carrier (9).

10. The clutch arrangement according to claim 1, wherein a recoil element (26) is situated, in the pressure compensation chamber (25) for an actuating piston (10) of the radially outer clutch (B), and the recoil element (26) is situated between the actuating piston (10) and a radially inner section (54) of a common disc carrier (9).

11. The clutch arrangement according to claim 1, wherein a radially aligned baffle plate (34) is fastened, in the pressure compensation chamber (25) for a piston (10) of the radially outer clutch (B), on an axially inner section (54) of a common disc carrier (9) such that a coolant or lubricant guide space (59) is formed between the baffle plate (34) and the axially inner section (54) to facilitate coolant or lubricant flow (30) to the radially outer clutch (B).

12. The clutch arrangement according to claim 1, wherein a baffle plate (34) has, on a radially inner section, an inlet aperture (51) through which the coolant or lubricant can enter from the pressure compensation chamber (25) and flow along a coolant or lubricant guide space (59) for the radially outer clutch (B).

13. The clutch arrangement according to claim 1, wherein in an area of a radially outer section of a baffle plate (34) a radially outlet aperture (48) is formed through which the coolant or lubricant can exit from a coolant or lubricant guide space (59).

14. The clutch arrangement according to claim 1, wherein a flow duct (62), for flow of the coolant or lubricant (30), is formed radially above an outlet aperture (48) in a common disc carrier (9), between the disc carrier (9) and a radially outer section of an actuating piston (17), for the radially inner clutch (E).

15. The clutch arrangement according to claim 1, wherein in a paraxially aligned section (63) of a common disc carrier (9), radially aligned apertures (piercing 14) are formed through which the coolant or lubricant (30) can flow and reach discs (21, 22) of the radially outer clutch (B).

16. The clutch arrangement according to claim 1, wherein in area beneath a disc set for the radially inner clutch (E), two actuating pistons (10, 17) are axially situated axially on opposite sides of a common disc carrier (9).

17. The clutch arrangement according to claim 1, wherein a radially inner section a baffle plate (34) is biased, by a recoil element (26) situated in the pressure compensation chamber (25) for the radially outer clutch (B), axially against a radially inner section (54) of a common disc carrier (9).

18. The clutch arrangement according to claim 1, wherein a radially outer section of a baffle plate (34) is clamped to an inner side of a horizontally aligned section (47) of a common disc carrier (9).

19. The clutch arrangement according to claim 1, wherein a baffle plate (34) carries, on an inner side of a radially outer section, a sealant (49) which seals the pressure compensation chamber (25) of the radially outer clutch (B) against an actuating piston (10) for actuating the radially outer clutch (B).

20. The clutch arrangement according to claim 1, wherein the pressure space (8) of the piston-cylinder arrangement for actuation of the radially inner clutch (E) is essentially formed by a wall of the inner section (54) of a common disc carrier (9) that faces away from the pressure compensation chamber (25) for a piston (10) of the radially outer clutch (B) and a section of a hub (3).

21. The clutch arrangement according to claim 1, wherein for the radially inner clutch (E), a pressure compensation space (31) is formed by a hub (3), a baffle plate (19) and a side of the actuating piston (17) facing away from a common disc carrier (9).

22. The clutch arrangement according to claim 1, wherein a recoil element (18) is situated, in a pressure compensation space (31) for the actuating piston (17) of the radially inner clutch (E), and the recoil element (18) is located between a baffle plate (19) and the actuating piston (17).

23. The clutch arrangement according to claim 1, wherein a baffle plate (19) has a seal (45) which seals against a left-side "t" leg (42) of a piston (17) of the radially inner clutch (E) facing away from a common disc carrier (9).

24. The clutch arrangement according to claim 1, wherein a piston (17), for actuation of the radially inner clutch (E), has a right-side "t" leg (43) which extends toward a paraxial section (47) of a common disc carrier (9).

25. The clutch arrangement according to claim 1, wherein a baffle plate (19) and a cylinder (5) are axially secured to a hub (3) by snap rings (4, 36).

26. The clutch arrangement according to claim 1, wherein a hub (3) is situated and rotatably supported upon an axial continuation (52) of a transmission housing (2), and axially supported via an axial bearing (53) against the axial continuation (52).

27. The clutch arrangement according to claim 1, wherein a transmission shaft (1) is an input shaft.

28. The clutch arrangement according to claim 1, wherein upon a side of a baffle plate (19), remote from the pressure compensation space (31) for the actuating piston (17) of the radially inner clutch (E), an inner disc carrier (37) of the radially inner clutch (E) is situated and connected with a transmission shaft (39).

29. The clutch arrangement according to claim 1, wherein between an inner disc carrier (37) and a baffle plate (19) of the pressure compensation space (31) for the actuating piston (17) of the radially inner clutch (E), a flow path (64) is formed for supplying a flow of the lubricant and coolant (20) for the radially inner clutch (E).

30. The clutch arrangement according to claim 1, wherein an outer disc carrier (38) of the radially outer clutch (B) is situated upon a side remote from a flow path (64) of an inner disc carrier (37) of the radially inner clutch (E).

31. The clutch arrangement according to claim 1, wherein an outer disc carrier (38) of the radially outer clutch (B) is situated upon a transmission shaft (40) which, by way of an axial bearing (56), is secured against a transmission shaft (39) on which an inner disc carrier (37) of the radially inner clutch (E) is fastened.

32. The clutch arrangement according to claim 1, wherein a transmission shaft (39), carrying an inner disc carrier (37) of the radially inner clutch (E), is supported by an axial bearing (55) against a transmission shaft (1) carrying a hub (3).

33. The clutch arrangement according to claim 1, wherein an actuating piston (10) of the radially outer clutch (B) has, on a radially outermost end thereof, a paraxial section (65) which is designed as a rotational speed indicator for a rotational speed sensor (12).

34. The clutch arrangement according to claim 1, wherein a radial arrangement of an aperture (51) in a baffle plate (34) defines a maximum fluid level (7) which the lubricant or coolant reaches in the pressure compensation chamber (25) for the actuating piston (10) of the radially outer clutch (B).

35. The clutch arrangement according to claim 1, wherein a supply of the coolant or lubricant to the pressure compensation chamber (25) for a piston (10) of the radially outer clutch (B) is controlled via a hole (57) in a hub (3) which communicates with a hole (29) in a axial continuation (52) of a transmission housing (2).

36. The clutch arrangement according to claim 1, wherein a pressure space (6) for the piston-cylinder arrangement (3, 5, 10) for actuation of the radially outer clutch (B) is supplied with an actuating pressure via a hole (58) in a hub (3) which is connected with a hole or peripheral groove (27) in an axial continuation (52) of a transmission housing (2).

37. The clutch arrangement according to claim 1, wherein a pressure space (8) of the actuating cylinder for the radially inner clutch (E) is filled via a hole (66) in a hub (3) which is in flow connection with a separate hole or annular groove (28) in an axial continuation (52) of a transmission housing (2).

38. The clutch arrangement according to claim 1, wherein the pressure compensation space (31) for the radially inner clutch (E) is supplied with the lubricant or coolant via a hole (61) in a hub (3).

* * * * *